(12) United States Patent
Nagano et al.

(10) Patent No.: US 6,756,812 B2
(45) Date of Patent: Jun. 29, 2004

(54) DIFFERENTIAL TERMINATION RESISTOR ADJUSTING CIRCUIT

(75) Inventors: Hideo Nagano, Tokyo (JP); Takahiro Miki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/263,661

(22) Filed: Oct. 4, 2002

(65) Prior Publication Data

US 2003/0189458 A1 Oct. 9, 2003

(30) Foreign Application Priority Data

Apr. 4, 2002 (JP) ...................................... 2002-102826

(51) Int. Cl.[7] .............................................. H03K 19/003
(52) U.S. Cl. ....................................... 326/60; 327/309
(58) Field of Search ................................ 327/309, 333, 327/319, 334; 326/30

(56) References Cited

U.S. PATENT DOCUMENTS

| | | | | |
|---|---|---|---|---|
| 5,559,448 A | * | 9/1996 | Koenig ........................... | 326/30 |
| 6,288,564 B1 | * | 9/2001 | Hedberg ........................ | 326/30 |
| 6,414,512 B1 | * | 7/2002 | Moyer ........................... | 326/30 |
| 6,424,169 B1 | * | 7/2002 | Partow et al. ................. | 326/30 |
| 2002/0186041 A1 | * | 12/2002 | Metz et al. .................... | 326/30 |
| 2003/0094990 A1 | * | 5/2003 | Chin-Hsien .................. | 327/362 |

FOREIGN PATENT DOCUMENTS

JP          11-317644          11/1999

* cited by examiner

Primary Examiner—Terry D. Cunningham
(74) Attorney, Agent, or Firm—Burns, Doane, Swecker & Mathis, L.L.P.

(57) ABSTRACT

A differential termination resistor adjusting circuit includes: a reference current producing section that produces a nearly constant reference current Iref, a reference voltage producing section that produces nearly constant reference voltages VrefH, VrefL, a replica resistor producing section that is provided with the reference current Iref to produce voltage drops Va, Vb, a control voltage producing section that produces control voltages Vcont1, Vcont2, based on the reference voltages VrefH, VrefL and the voltage drops Va, Vb, and a genuine resistor producing section that is built in a receiving side device and is connected to an input termination, characterized in that the resistances of the replica resistor producing section and the genuine resistor producing section are adjusted by the control voltages Vcont1, Vcont2.

7 Claims, 14 Drawing Sheets

DIFFERENTIAL TERMINATION RESISTOR ADJUSTING CIRCUIT

BACKGROUND OF THE INVENTION

1. Field of the Invention

The present invention relates to a differential termination resistor adjusting circuit that is used for a data transmission system having a plurality of data transmission channels and, in particular, for a system requiring adjusting an input impedance in a receiving side device (Rx), and a differential termination resistor adjusting circuit that has been used in recent years for a monitor and the like having a digital I/F and that is used for building a termination resistor in a differential transmission system such as LVDS or the like, featuring high speed, low voltage, and low noise transmission, in the chip of the receiving side device (Rx).

2. Description of the Related Art

FIG. 13 is an equivalent circuit of a data transmission between different devices of a transmission system (single end transmission system) in the prior art. FIG. 14 is an equivalent circuit of a data transmission between different devices of a transmission system (differential transmission system) in the prior art. FIG. 15 is an equivalent circuit of a data transmission between different devices of a transmission system (transmission system having a matched impedance) in the prior art. In FIG. 13, FIG. 14 and FIG. 15, a reference numeral 1 denotes a transmitting side device (Tx); a reference numeral 2 denotes a receiving side device (Rx); reference numerals 3 and 4 denote transmission lines having impedance of Z0; and reference numerals 5 and 6 denote termination resistors.

Next, operation will be described.

In the data transmission, generally, when in a case that the propagation delay time in the transmission lines 3, 4 is longer than the rise up time or fall down time of a signal, it is necessary to treat the transmission line as a distributed constant line and to take into account also noises such as reflection or the like.

At this point, especially in a high speed data transmission system, in many cases, the propagation delay time in the transmission lines 3, 4 is longer than the rise up time or fall down time of a signal. Thus, it is necessary to take measures against noises such as reflection caused by the impedance mismatch between the transmission lines 3 and 4.

In contrast, to take an impedance matching of the transmission line 3 to that of the transmission line 4, in general, termination resistors 5 and 6 are used. In the case where the output impedance (Z1) of the transmitting side device 1, the characteristic impedances (Z0) of the transmission lines 3 and 4, and the values of resistances (ZL) of the termination resistors 5 and 6 are matched to each other, reflection is not fundamentally produced.

That is to say, in the high speed data transmission system, it is important to match the termination resistor to the characteristic impedance of the transmission line.

As shown in FIG. 15, however, the data bus between the transmitting and receiving devices of an ordinary high speed data transmission system constitutes, in many cases, a multi bit bus such as 8 bit bus, 16 bit bus or the like. In the multi bus like this, there is presented a problem that adding the termination resistors 5, 6 to all the input terminals of the receiving side device 2 increases the number of elements mounted on a substrate to thereby cause an increase in the cost of the system and the mounting area of the substrate.

At this point, there is presented a problem that building the termination resistors 5, 6 in the receiving side device 1, because the resisters have generally characteristics of variations by manufacturing, it increases a possibility that the resistors and thus raises causing the impedance mismatch. In addition, there is presented a problem of producing an inconvenience that building the termination resistors 5, 6 in the receiving side device 1 results in setting the resistances of the resistors at certain target values to thereby make it impossible to share the device among systems having the different characteristic impedances of transmission lines. Thus, adding the termination resistor externally to the device in accordance with the characteristic impedance of the transmission line used was more advantageous in the aspect of characteristics.

Because the transmission system in the prior art is constituted in the manner described above, there is presented a problem that building the termination resistors in the receiving side device increases variations in manufacturing the resistors and thus raises the possibility of causing an impedance mismatch. Furthermore, there is presented a problem of producing an inconvenience that building the termination resistors in the receiving side device results in setting the resistances of the resistors at certain target values to thereby make it impossible to share the device among the systems having the different characteristic impedances of the transmission lines.

SUMMARY OF THE INVENTION

The present invention has been made to solve the problems mentioned above. It is the object of the present invention to provide a differential termination resistor adjusting circuit in which an input termination resistor is built in a semiconductor device to reduce the cost of a transmission system and the mounting area of a substrate.

Further, in a differential transmission system, it is the object of the present invention to keep an impedance matching in a transmission system at the same level as compared with a case where an external resistor is used, by means of reducing variations in the resistance of the termination resistor built in the semiconductor device as compared with the prior art.

Still further, in the differential transmission system, it is the object of the present invention to make the termination resistors of all the data buses equal to the characteristic impedance of the transmission line and to vary the value of the impedance by externally mounting one reference resistor that is equal to the characteristic impedance of the transmission line.

Still further, in the differential transmission system, it is the object of the present invention to share a semiconductor device also among systems that are different from each other in the characteristic impedance of the transmission line by varying the resistance of the reference resistor.

A differential termination resistor adjusting circuit in accordance with the present invention includes: a reference current producing section that produces a nearly constant reference current irrespective of variations in power supply voltage, temperature, and manufacturing; a reference voltage producing section that produces a nearly constant reference voltage irrespective of variations in the power supply voltage, the temperature, and the manufacturing; a replica resistor producing section that is supplied with the reference current to produce a voltage drop; a control voltage producing section that produces a control voltage based on the reference voltage and the voltage drop; and a genuine resistor producing section that is built in a receiving side device and is connected to an input termination, wherein the resistances of the replica resistor producing section and the genuine resistor producing section are adjusted by the control voltage.

As described above, according to the present invention, in the differential transmission system, the resistance of the input termination resistor built in the semiconductor device can be adjusted. Therefore, it is made so as to be possible to produce an effect of reducing the cost of the differential transmission system and the mounting area of the substrate and to keep the impedance matching of the differential transmission system at the same level as compared with the case where the external resistor is used by sufficiently reducing variations in the resistance of the input termination resistor as compared with the prior art.

DETAILED DESCRIPTION OF THE PREFERRED EMBODIMENTS

The preferred embodiments of the present invention will be described.

Preferred Embodiment 1

Figure 16:
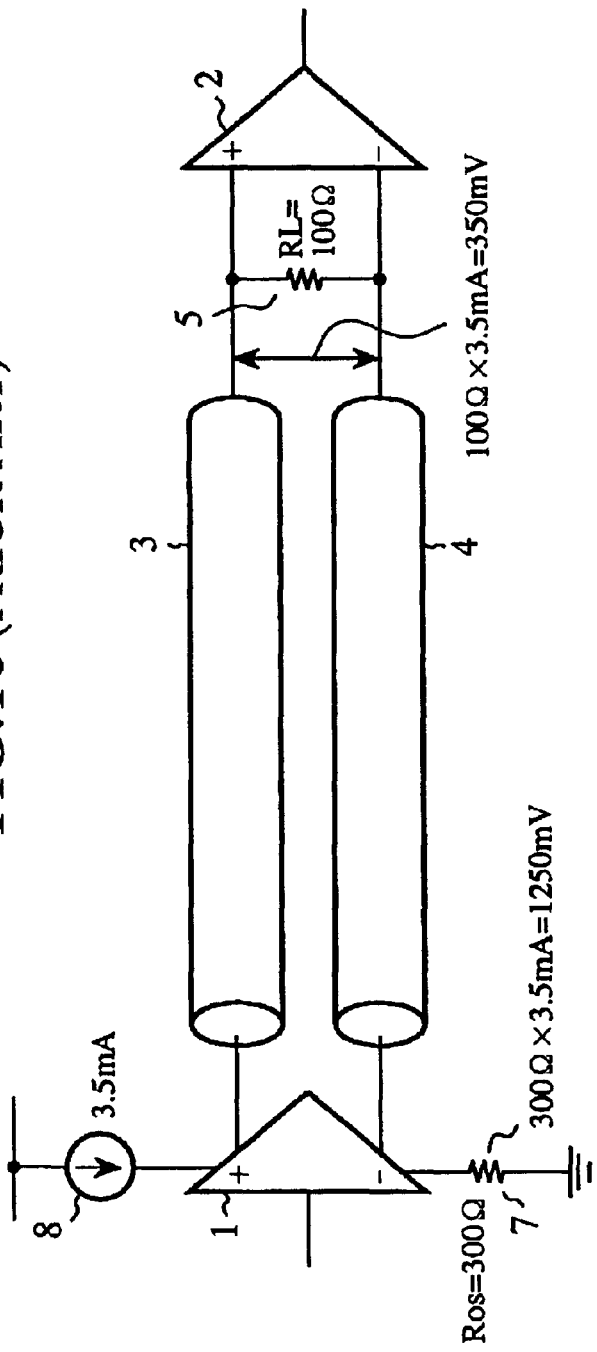
FIG. 16 is a block diagram to show the differential transmission system of an LVDS.

One of typical differential transmission systems is an LVDS (Low Voltage Differential Signal). FIG. 16 is a block diagram to show the differential transmission system of the LVDS. In FIG. 16, a reference numeral 1 denotes a transmitting side device; a reference numeral 2 denotes a receiving side device; reference numerals 3 and 4 denote transmission lines; a reference numeral 5 denotes a termination resistor; a reference numeral 7 denotes a resistor for generating an offset voltage; and a reference numeral 8 denotes a current source.

Figure 17:
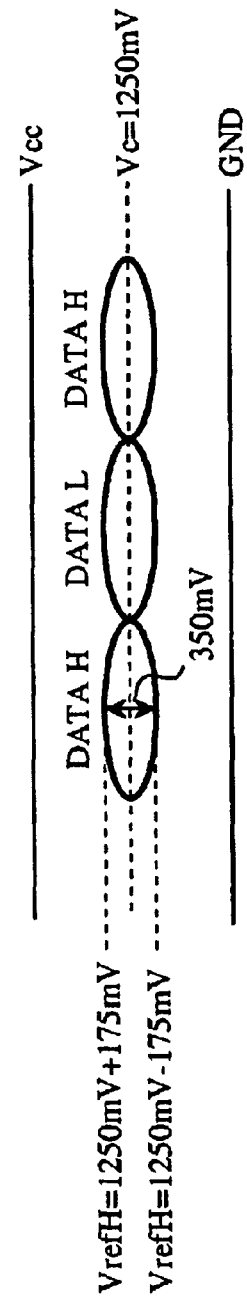
FIG. 17 is a view to show the operating waveform of the differential transmission system of an LVDS.

FIG. 17 is a view to show the operating waveform of the differential transmission system of the LVDS. First, the differential transmission system of the LVDS will be simply described with reference to FIG. 16 and FIG. 17. In the transmission system of the LVDS, the transmitting side device (Tx) 1 always supplies a current of 3.5 mA and an input amplifier of the receiving side device (Rx) 2 amplifies the differential voltage generated by the voltage drop of a termination resistor (RL) 5 mounted before the receiving side device (Rx) 2. A differential common voltage is clamped at 1250 mV by a resistor, Ros7 that is mounted on the Tx side to generate an off set voltage. Further, as shown in FIG. 17, the voltage level across both ends of the termination resistor (RL) 5 is varied by the polarity of the data of the Tx.

The present invention has been made in order to built the termination resistor RL of the differential transmission system of the LVDS or the like in the chip of the Rx.

Figure 1:
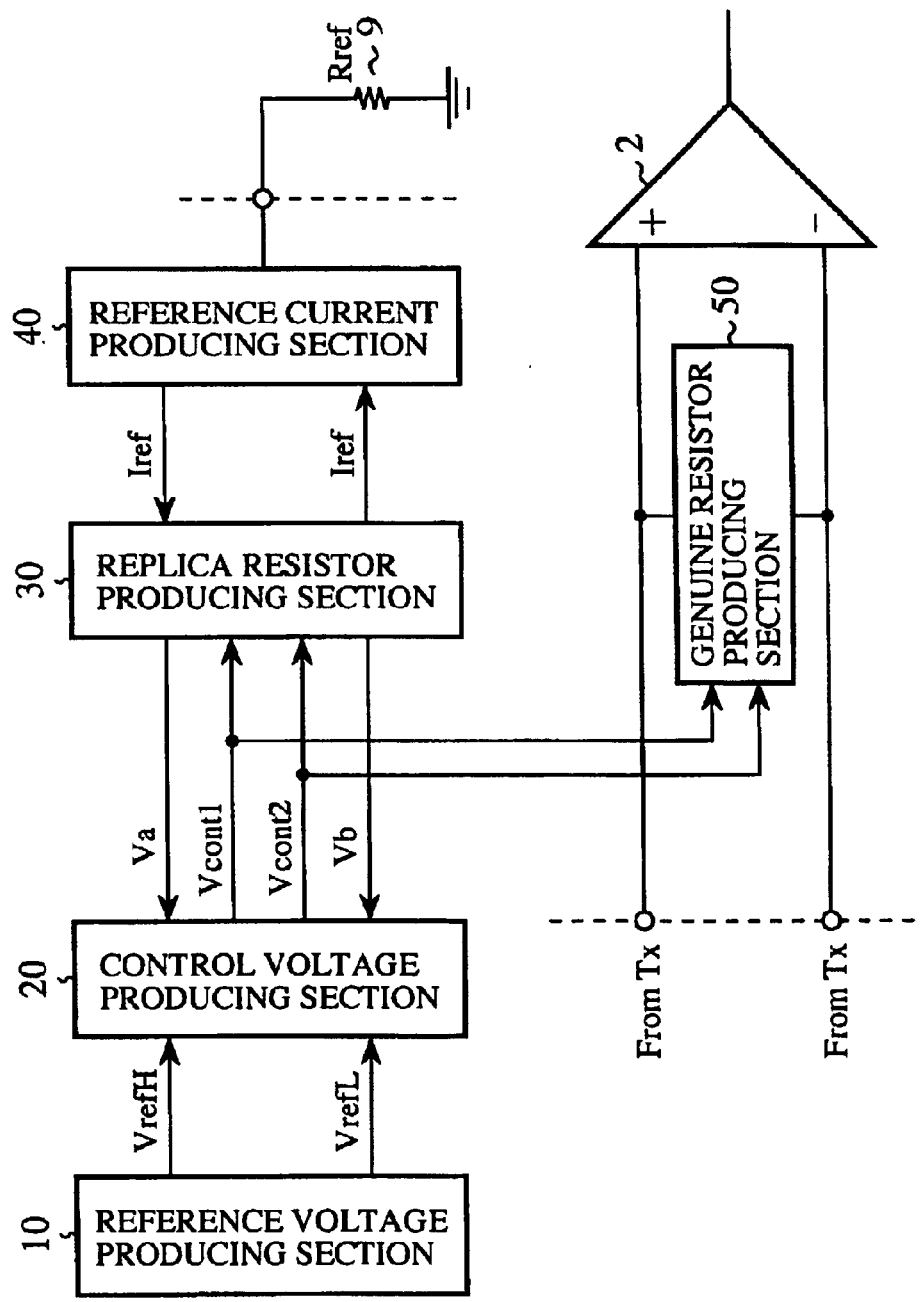
FIG. 1 is a block diagram to show the differential termination resistor adjusting circuit in accordance with the preferred embodiment 1 of the present invention.
Figure 2:
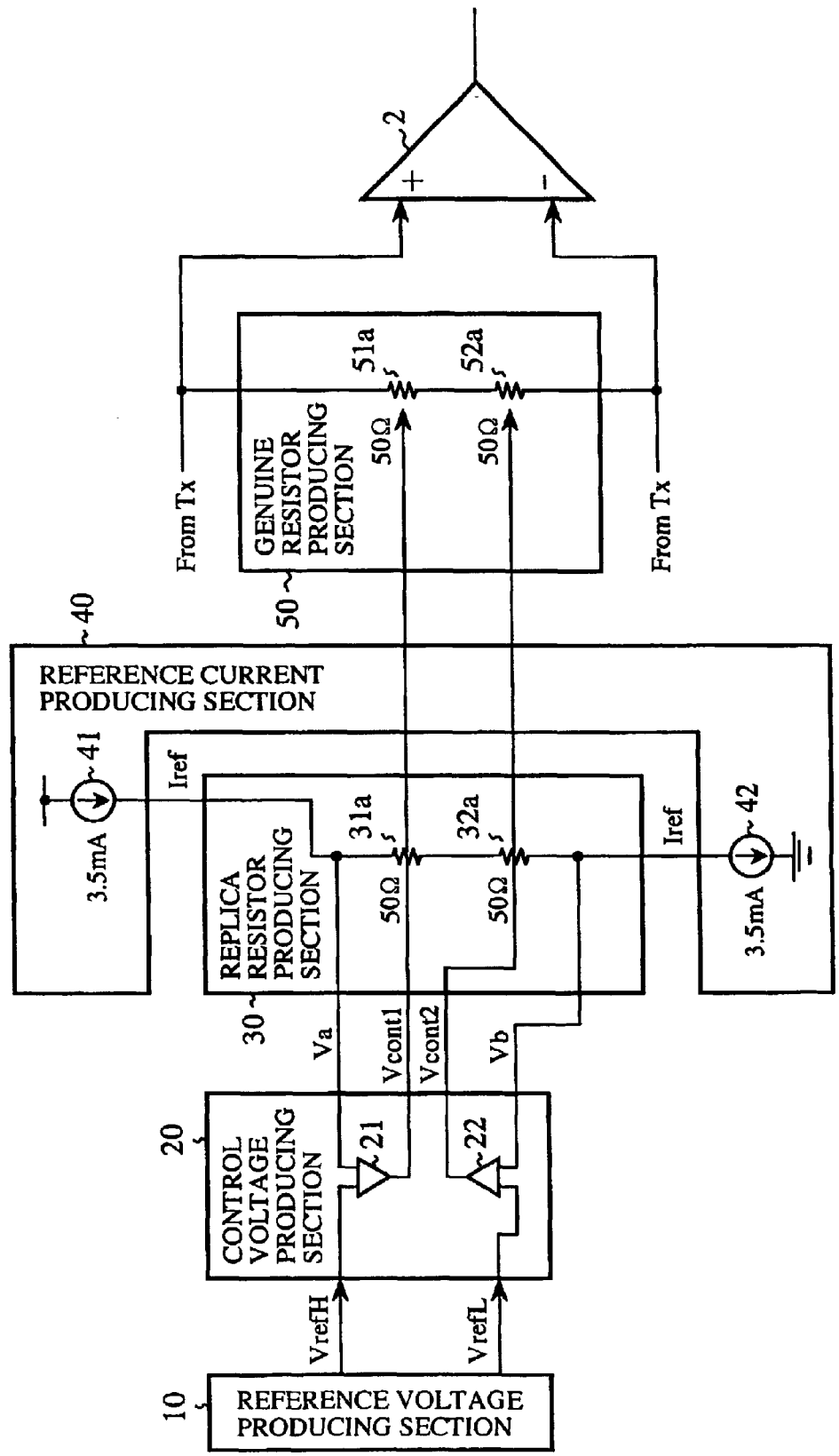
FIG. 2 is an equivalent circuit diagram of the termination resistor adjusting circuit in accordance with the preferred embodiment 1 of the present invention.

FIG. 1 is a block diagram to show a differential termination resistor adjusting circuit in accordance with the preferred embodiment 1 of the present invention. FIG. 2 is an equivalent circuit diagram of the differential termination resistor adjusting circuit in accordance with the preferred embodiment 1 of the present invention. In FIG. 1 and FIG. 2, a reference numeral 10 denotes a reference voltage producing section; a reference numeral 20 denotes a control voltage producing section; a reference numeral 30 denotes a replica resistor producing section; a reference numeral 40 denotes a reference current producing section; a reference numeral 50 denotes a genuine resistor producing section; a reference numeral 2 denotes a receiving side device; a reference numeral 9 denotes an external resistor (Rref); reference numerals 21 and 22 denote operating amplifiers; reference numerals 31a and 32a denote resistors; and reference numerals 51a and 52a denote resistors.

Next, connection will be described.

To one input of the operating amplifier 21 of the control voltage producing section 20 shown in FIG. 1 is applied a reference voltage VrefH from the reference voltage producing section 10, and to the other input of the operating amplifier 21 is applied a voltage Va from the replica resistor producing section 30. From the output of the operating amplifier 21 is produced a control voltage Vcont1, and the control voltage Vcont1 is supplied to the replica resistor producing section 30 and the genuine resistor producing section 50.

To one input of the operating amplifier 22 of the control voltage producing section 20 is applied a reference voltage VrefL from the reference voltage producing section 10, and to the other input of the operating amplifier 22 is applied a voltage Vb from the replica resistor producing section 30. From the output of the operating amplifier 21 is produced a control voltage Vcont2, and the control voltage Vcont2 is supplied to the replica resistor producing section 30 and the genuine resistor producing section 50.

A reference current Icef flows out from the current source 41 of the reference current producing section 40 in FIG. 2 and flows into the resistor 31a of the replica resistor producing section 30. A reference current Iref from the resistor 32a of the replica resistor producing section 30 flows into the current source 42 of the reference current producing section 40.

In FIG. 1 and FIG. 2, to make the drawing clear, the genuine resistor producing section 50 is shown outside the receiving side device 2, but the genuine resistor producing section 50 is built in the receiving side device 2 in the present preferred embodiment 1 and the preferred embodiments 2 to 8 that will be described later. Also in FIGS. 4, 5, 6, 7, 9, 10 and 12, the genuine resistor producing section 50 is shown outside the receiving side device 2, but the genuine resistor producing section 50 is built in the receiving side device 2 in the preferred embodiments of the present invention.

Next, operation will be described.

First, the reference voltage producing section 10 utilizing a band gap circuit or the like produces the reference voltage VrefH and the reference voltage VrefL that are shown in FIG. 17. Next, a reference voltage of 350 mV shown in FIG. 17 that has small variations in temperature, voltage, and manufacturing is produced by the use of an external resistor (Rref) 9 that has extremely small variations in temperature and voltage and a reference voltage circuit such as band gap or the like. Voltage Va and voltage Vb that are produced from the replica resistor producing section 30 are applied to the control voltage producing section 20, and voltage VrefH and voltage VrefL that are produced from the reference voltage producing section 10 are applied to the control voltage producing section 20.

In the control voltage producing section 20 are produced control voltage Vcont1 and control voltage Vcont2 for producing an on resistor Ron $$Ron=(VrefH-RrefL)/3.5\ mA=100\Omega \quad (1)$$

To the genuine resistor producing section 50 disposed at the input terminal of the receiving side device 2 is applied the voltage Vcont1 and the control voltage Vcont2 that are to be applied to the replica resistor producing section 30. Here, by applying the voltage Vcont1 and the control voltage Vcont2 to the genuine resistor producing section 50, resistor 51a and resistor 52a are realized each of which has the same resistance as each of resistor 31a and resistor 32a that are produced by the replica resistor producing section 30.

The operating amplifier 21 of the control voltage producing section 20 shown in FIG. 2 has the reference voltage VrefH from the reference voltage producing section 10 and the voltage Va from the replica resistor producing section 30 applied thereto and produces a control voltage Vcont1 that is proportional to the difference between the reference voltage VrefH and the voltage Va. The operating amplifier 22 of the control voltage producing section 20 shown in FIG. 2 has the reference voltage VrefH from the reference voltage producing section 10 and the voltage Va from the replica resistor producing section 30 applied thereto and produces a control voltage Vcont2 that is proportional to the difference between the reference voltage VrefL and the voltage Vb. The Va produced from the replica resistor producing section 30 corresponds to the electric potential of a terminal into which the reference current Iref of the resistor 31a of the replica resistor producing section 30 flows, and the Vb produced from the replica resistor producing section 30 corresponds to the electric potential of a terminal from which the reference current Iref of the resistor 32a of the replica resistor producing section 30 flows out.

As described above, the differential termination resistor adjusting circuit in accordance with the present preferred embodiment 1 includes the reference current producing section (40) that produces nearly constant reference current (Iref) irrespective of variations in power supply voltage, temperature, and manufacturing; the reference voltage producing section (10) that produces nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section that is built in the receiving side device (2) and is connected to the input terminal, wherein the resistance of the replica resistor producing section and the resistance of the genuine resistor producing section are adjusted by the control voltages (Vcont1, Vcont2).

As described above, according to the present preferred embodiment 1, in the differential transmission system, the resistance of the input termination resistor built in the semiconductor device is adjusted. Thus, it is possible to produce effects of reducing the cost of the differential transmission system and the packaging area of the substrate, sufficiently reducing variations in the resistance of the input termination resistor as compared with the conventional one, and keeping the impedance matching of the differential transmission system at the same level as compared with the case where an external resistor is used.

Preferred Embodiment 2

Figure 3:
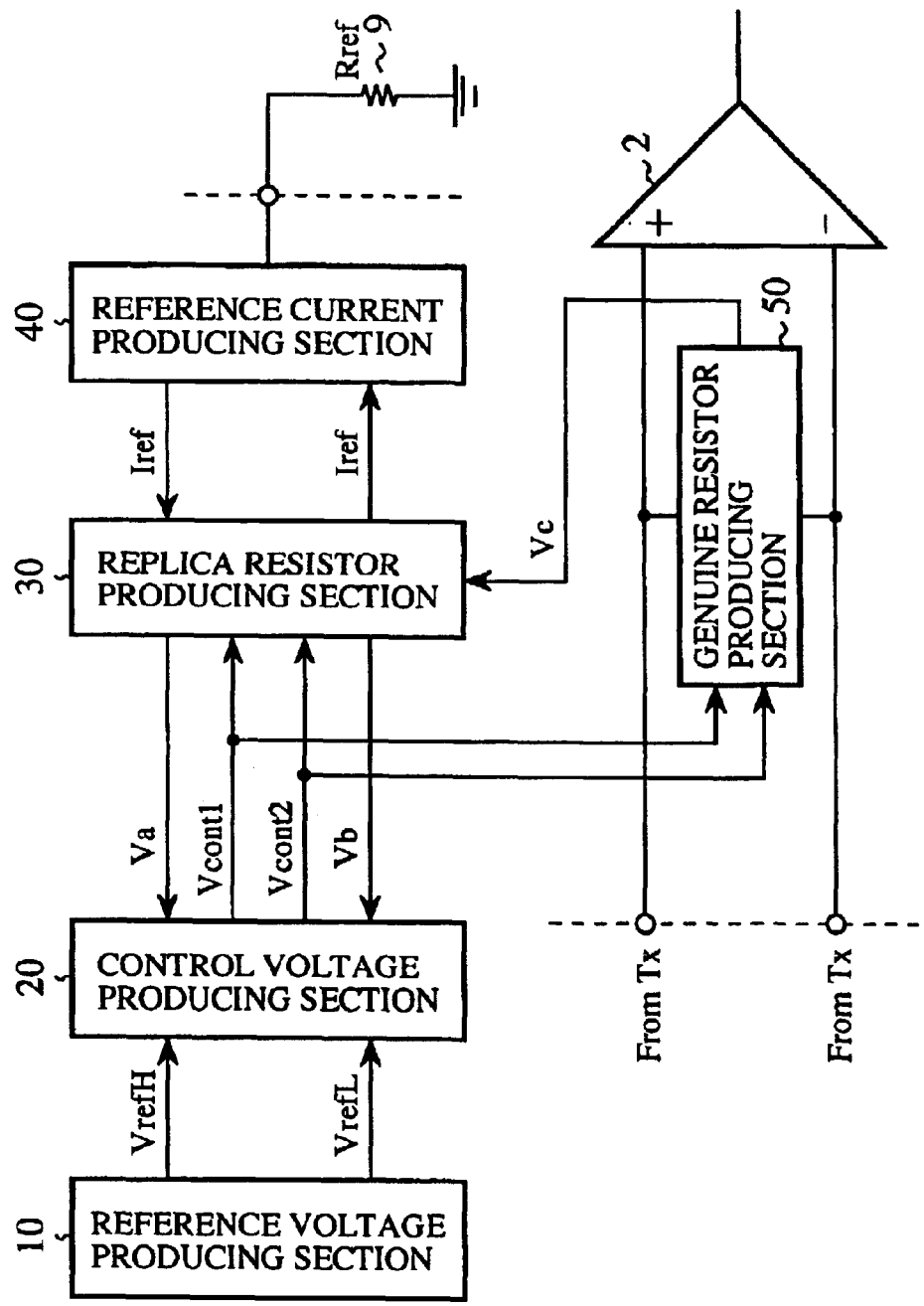
FIG. 3 is a block diagram to show the differential termination resistor adjusting circuit in accordance with the preferred embodiment 2 of the present invention.
Figure 4:
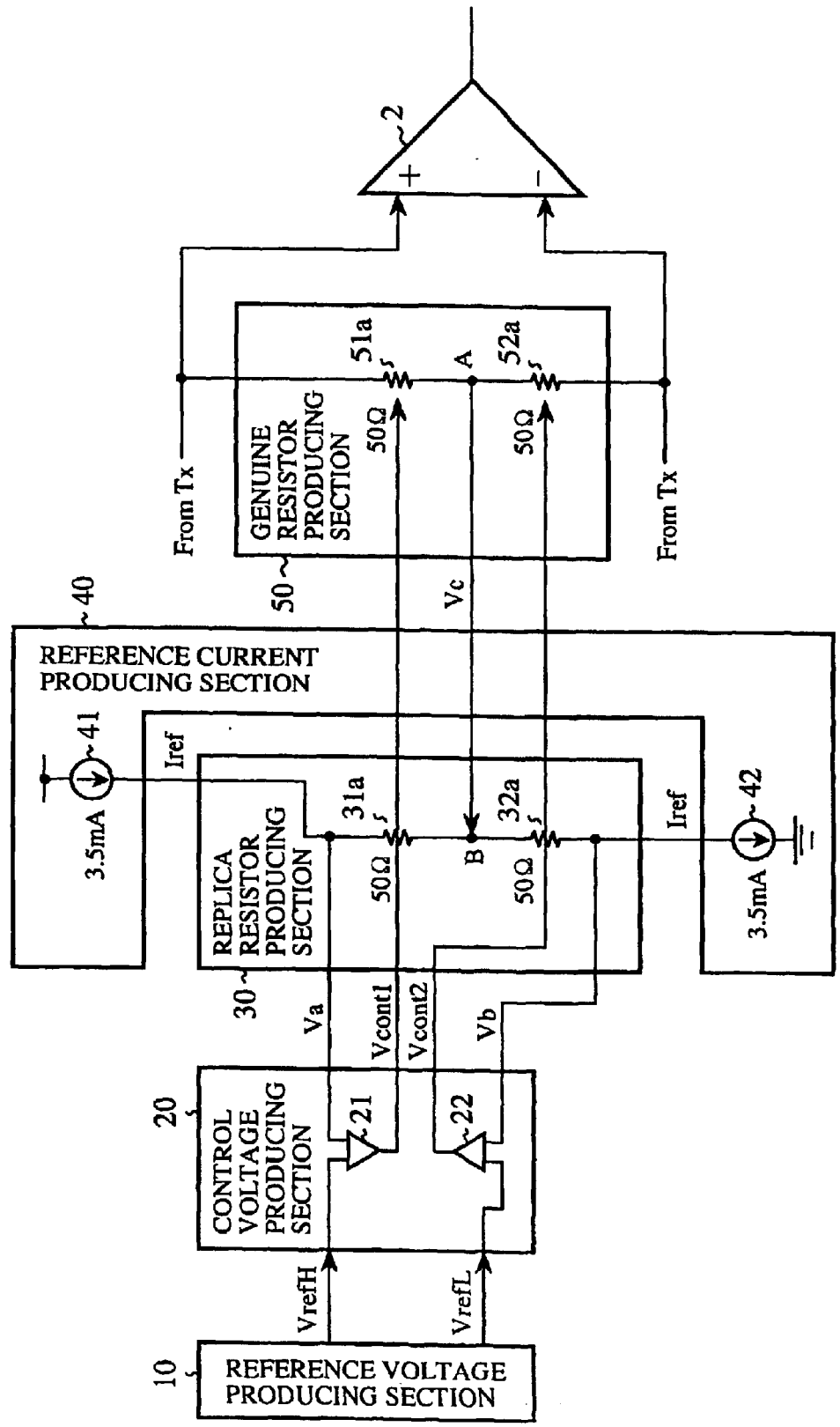
FIG. 4 is an equivalent circuit diagram of the differential termination resistor adjusting circuit in accordance with the preferred embodiment 2 of the present invention.

FIG. 3 is a block diagram to show a differential termination resistor adjusting circuit in accordance with the preferred embodiment 2 of the present invention, and FIG. 4 is an equivalent circuit diagram of the differential termination resistor adjusting circuit in accordance with the preferred embodiment 2 of the present invention. In FIG. 3 and FIG. 4, the same reference numerals as those of FIG. 1 and FIG. 2 denote the same or equivalent constituent elements. In this preferred embodiment 2, as compared with the preferred embodiment 1, the electric potential Vc of the connection point (reference point A) of the resistor 51a and resistor 52a of the genuine resistor producing section 50 is fed back to the connection point (reference point B) of the resistor 31a and resistor 32a of the replica resistor producing section 30.

Next, operation will be described.

As described above, as compared with the preferred embodiment 1, the present preferred embodiment 2 is equivalent to the preferred embodiment 1 except that the electric potential Vc from the genuine resistor producing section 50 is fed back to the replica resistor producing section 30. Thus, only a difference in operation caused by this difference will be described. The other operations are equivalent to those in the preferred embodiment 1.

The resistors 31a and 32a of the replica resistor producing section 30 each have a resistance of 50 Ω and are connected in series to each other to realize the termination resistor (resistance of 100 Ω) of the replica resistor producing section 30, and the resistors 51a and 52a of the genuine resistor producing section 50 each have a resistance of 50 Ω and are connected in series to each other to realize the termination resistor (resistance of 100 Ω) of the genuine resistor producing section 50. By developing a short circuit between the connection point of the resistors 31a and 32a of the replica resistor producing section 30 and the connection point of the resistors 51a and 52a of the genuine resistor producing section 50 and by feeding back the electric potential Vc of the connection point of the resistors 51a and 52a of the genuine resistor producing section 50 to the connection point of the resistors 31a and 32a of the replica resistor producing section 30, the voltages Va and Vb produced from the replica resistor producing section 30 become the values determined with reference to the electric potential Vc, which can realize a stable resistance control.

As described above, the differential termination resistor adjusting circuit in accordance with the present preferred embodiment 2 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of 30 the genuine resistor producing section are adjusted by the control voltages (Vcont1, Vcont2) and wherein the potential of the reference point (A) of the genuine resistor producing section (50) is fed back to the reference point (B) of the replica resistor producing section (30).

As described above, according to the present preferred embodiment 2, the electric potential of the reference point of the genuine resistor producing section is fed back to the reference point of the replica resistor producing section, so that it is possible to produce an effect of realizing a stable resistance control.

Preferred Embodiment 3

Figure 5:
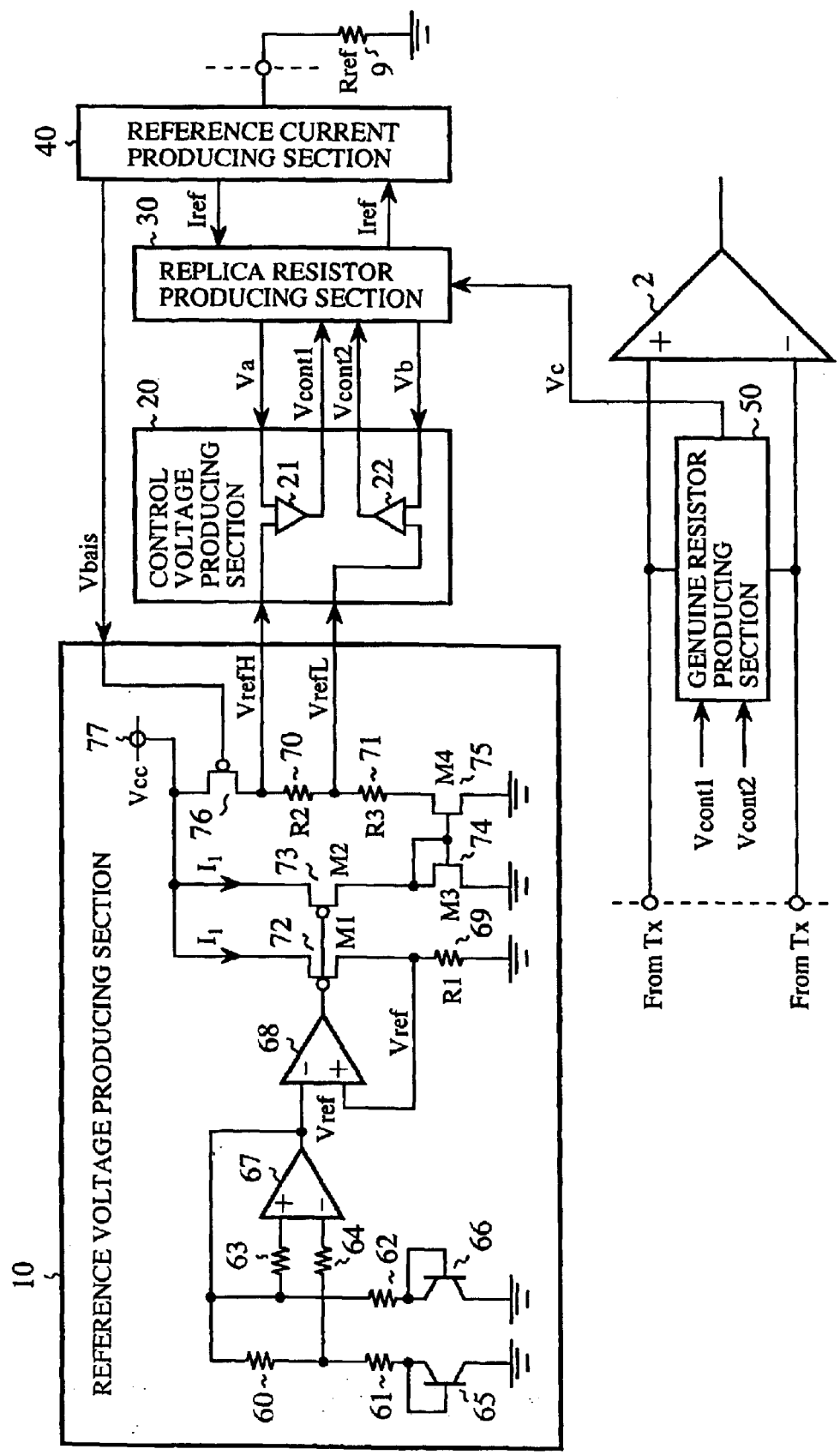
FIG. 5 is an equivalent circuit diagram of the differential termination resistor adjusting circuit in accordance with the preferred embodiment 3 of the present invention.

FIG. 5 is an equivalent circuit diagram of the differential termination resistor adjusting circuit in accordance with the preferred embodiment 3 of the present invention. In FIG. 5, the same reference numerals as those in FIGS. 1 to 4 denote the same or equivalent constituent elements. In FIG. 5, reference numerals 60 to 64 denote resistors; reference numerals 65 and 66 denote transistors; reference numerals 67 and 68 denote operational amplifiers; reference numerals 69 to 71 denote resistors; reference numerals 72 and 73 denote P channel transistors; reference numerals 74 and 75 denote N channel transistors; a reference numeral 76 denotes a P channel transistor; and a reference numeral 77 denotes a power supply voltage. In this preferred embodiment 3, the reference voltage producing section of the preferred embodiment 2 is constituted in the manner shown in FIG. 5.

Next, connection will be described.

One terminal of the resistor 60 is connected to one terminal of the resistor 63 and one terminal of the resistor 62. The other terminal of the resistor 60 is connected to one terminal of the resistor 61 and one terminal of the resistor 64. The other terminal of the resistor 61 is connected to the base and the collector of the transistor 65. The emitter of the transistor 65 is connected to the ground. The other terminal of the resistor 62 is connected to the base and the collector of the transistor 66. The emitter of the transistor 66 is connected to the ground. The other terminal of the resistor 63 is connected to the non inverting input of the operational amplifier 67. The other terminal of the resistor 64 is connected to the inverting input of the operational amplifier 67. The output of the operating amplifier 67 is connected to one terminal of the resistor 63 and the inverting input of an operational amplifier 68.

One terminal of the resistor 69 is connected to the non inverting input of the operational amplifier 68. The other terminal of the resistor 69 is connected to the ground. The output of the operational amplifier 68 is connected to the gate of the P channel transistor 72 and the gate of the P channel transistor 73. The drain of the P channel transistor 73 is connected to the power supply voltage 77 (Vcc). The source of the P channel transistor 73 is connected to one terminal of the resistor 69. The drain of the P channel transistor 73 is connected to the power supply voltage 77 (Vcc). The source of the P channel transistor 73 is connected to the drain and the gate of the N channel transistor 74. The source of the N channel transistor 74 is connected to the ground.

The drain of the P channel transistor 76 is connected to the power supply voltage 77. A voltage Vbais from a reference current producing section 40 is applied to the gate of the P channel transistor 76. The source of the P channel transistor 76 is connected to one of the resistor 70. The other terminal of the resistor 70 is connected to one of the resistor 71. The other terminal of the resistor 71 is connected to the drain of an N channel transistor 75. The gate of the N channel transistor 75 is connected to the gate of the N channel transistor 74. The source of the N channel transistor 75 is connected to the ground.

The connection point of the source of the P channel transistor 76 and one terminal of the resistor 70 is connected to the input of the operational amplifier 21 of the control voltage producing section 20. The connection point of the other terminal of the resistor 70 and one terminal of the resistor 71 is connected to the input of the operational amplifier 22 of the control voltage producing section 20.

In the reference voltage producing section 10, the resistors 60 to 64, transistors 65 and 66, and the operational amplifier 67 constitute a band gap circuit.

Next, operation will be described.

The present preferred embodiment 3 is the same as the preferred embodiment 1 and the preferred embodiment 2 except that the reference voltage producing section 10 is constituted in the manner shown in FIG. 5. The operation of the reference voltage producing section 10 will be described. The other operations are equivalent to the operations in the preferred embodiment 1 and the preferred embodiment 2.

In the reference voltage producing section 10 shown in FIG. 5, the resistance R1 of the resistor 69, the resistance R2 of the resistor 70 and the resistance R3 of the resistor 71 are determined by the use of the band gap circuit such that the reference voltage VrefH and the reference voltage VrefL shown in FIG. 17 have the following relationships.

$$VrefH = Vc + Vref/(R1 \times R2) = Vc + 350 \text{ mV}/2 \quad (2)$$

$$VrefL = Vc - Vref/(R1 \times R3) = Vc + 350 \text{ mV}/2 \quad (3)$$

where Vref is the electric potential of the inverting input and the non inverting input of the operational amplifier 68.

As described above, the differential termination resistor adjusting circuit in accordance with the present preferred embodiment 3 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2) and wherein the electric potential of the reference point (A) of the genuine resistor producing section (50) is fed back to the reference point (B) of the replica resistor producing section (30) and wherein the reference voltage producing section (10) has the band gap circuit (60 to 64, 65 to 67).

As described above, according to the present preferred embodiment 3, the reference voltage is produced by the use of the band gap circuit, so that it is possible to produce an effect of precisely adjusting the resistance of the input termination resistor.

Preferred Embodiment 4

Figure 6:
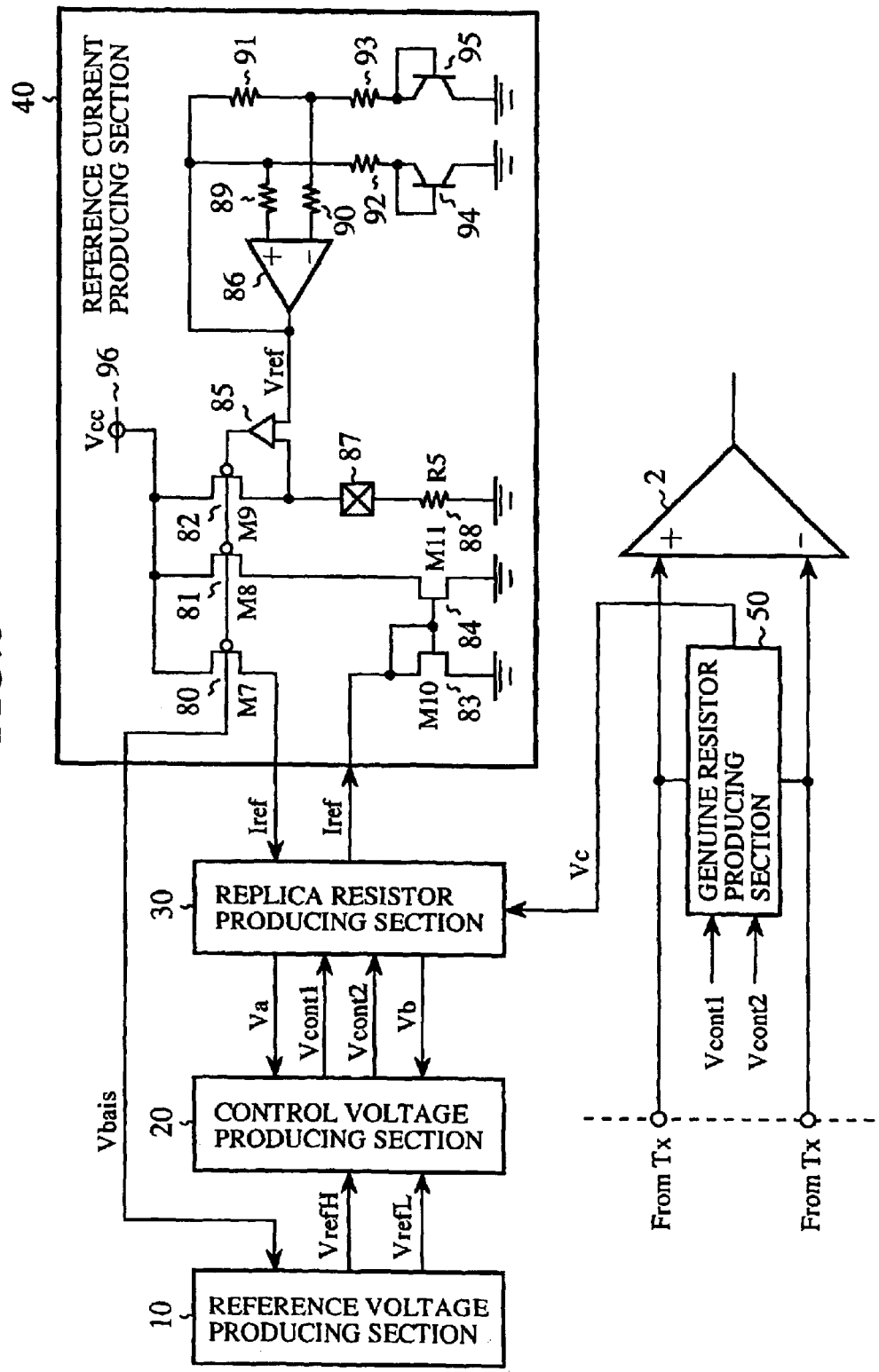
FIG. 6 is an equivalent circuit diagram of the differential termination resistor adjusting circuit in accordance with the preferred embodiment 4 of the present invention.

FIG. 6 is an equivalent circuit diagram of the differential termination resistor adjusting circuit in accordance with the preferred embodiment 4 of the present invention. In FIG. 6, the same reference numerals as those in FIGS. 1 to 4 denote the same or equivalent constituent elements. In FIG. 6, reference numerals 80 to 82 denote P channel resistors; reference numerals 83 and 84 denote N channel transistors; reference numerals 85 and 86 denote operational amplifiers; a reference numeral 87 denotes an external terminal; reference numerals 88 to 93 denote resistors; reference numerals 94 and 95 denote transistors; and a reference numeral 96 denotes a power supply voltage. In this preferred embodiment 4, the reference voltage producing section 40 of the preferred embodiment 2 is constituted in the manner shown in FIG. 6.

Next, connection will be described.

The drains of the P channel transistor 80, the P channel transistor 81, and the P channel transistor 82 are connected to the power supply voltage 96 (Vcc). The reference current Iref supplied to the replica resistor producing section 30 flows out of the source of the P channel transistor 80. The source of the P channel transistor 81 is connected to the drain of the N channel transistor 84. The source of the P channel transistor 82 is connected to the external terminal 87 and the one input of the operational amplifier 85. To the other input of the operational amplifier 85 is connected the output of the operational amplifier 86. The output of the operational amplifier 85 is connected to the gates of the P channel transistor 80, the P channel transistor 81, and the P channel transistor 82 and the voltage Vbias produced by the operational amplifier 85 is supplied to the reference voltage producing section 10.

The drain and gate of the N channel transistor 83 are connected to each other and the reference current Iref from the replica resistor producing section 30 flows into them. The source of the N channel transistor 83 is connected to the ground. The gate of the N channel transistor 84 is connected to the gate of the N channel transistor 83. The source of the N channel transistor 84 is connected to the ground.

One terminal of the resistor 88 is connected to the external terminal 87 and the other terminal of the resistor 88 is connected to the ground. The non inverting input of the operational amplifier 86 is connected to one terminal of the resistor 89 and the inverting input of the operational amplifier 86 is connected to one terminal of the resistor 90. The output of the operational amplifier 86 is connected to the other terminal of the resistor 89 and the one terminal of the resistor 91. The other terminal of the resistor 92 is connected to the collector and base of the transistor 94. The other terminal of the resistor 91 is connected to the other terminal of the resistor 90 and the one terminal of the resistor 93. The other terminal of the resistor 93 is connected to the collector and base of the transistor 95. The emitter of the transistor 94 is connected to the ground. The emitter of the transistor 95 is connected to the ground.

In the reference current producing section 40, the resistors 89 to 93, transistors 94 and 95, and the operational amplifier 86 constitute a band gap circuit.

Next, operation will be described.

The present preferred embodiment 4 is identical to the preferred embodiment 1 and the preferred embodiment 2 except that the reference current producing section 40 is constituted in the manner shown in FIG. 6. Thus, the operation of the reference current producing section 40 will be described. The other operations are equivalent to the operations in the preferred embodiment 1 and the preferred embodiment 2.

In the reference current producing section 40 shown in FIG. 6, the value of the reference current Iref shown in FIG. 6 is adapted to be 3.5 mA by the use of the band gap circuit.

As described above, the differential termination resistor adjusting circuit in accordance with the present preferred embodiment 4 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2), and wherein the electric potential of the reference point (A) of the genuine resistor producing section (50) is fed back to the reference point (B) of the replica resistor producing section (30), and wherein the reference current producing section (40) has the band gap circuit (86, 89 to 93, 94, and 95) and the external terminal (87) to which an external resistor having the nearly constant resistance even if the power supply voltage and the temperature vary is connected.

As described above, according to the present preferred embodiment 4, there is provided the external terminal for externally mounting one reference resistor that is proportional to the characteristic impedance of the transmission line. Thus, this can make it possible to make the termination resistors of all data buses equal to the characteristic impedance of the transmission line and to vary the value of the impedance. Therefore, it is possible to produce an effect of making a semiconductor device shareable also in systems each having a different characteristic impedance of the transmission line without redesigning the semiconductor device by changing the resistance of the reference resistor in the differential transmission system.

Preferred Embodiment 5

Figure 7:
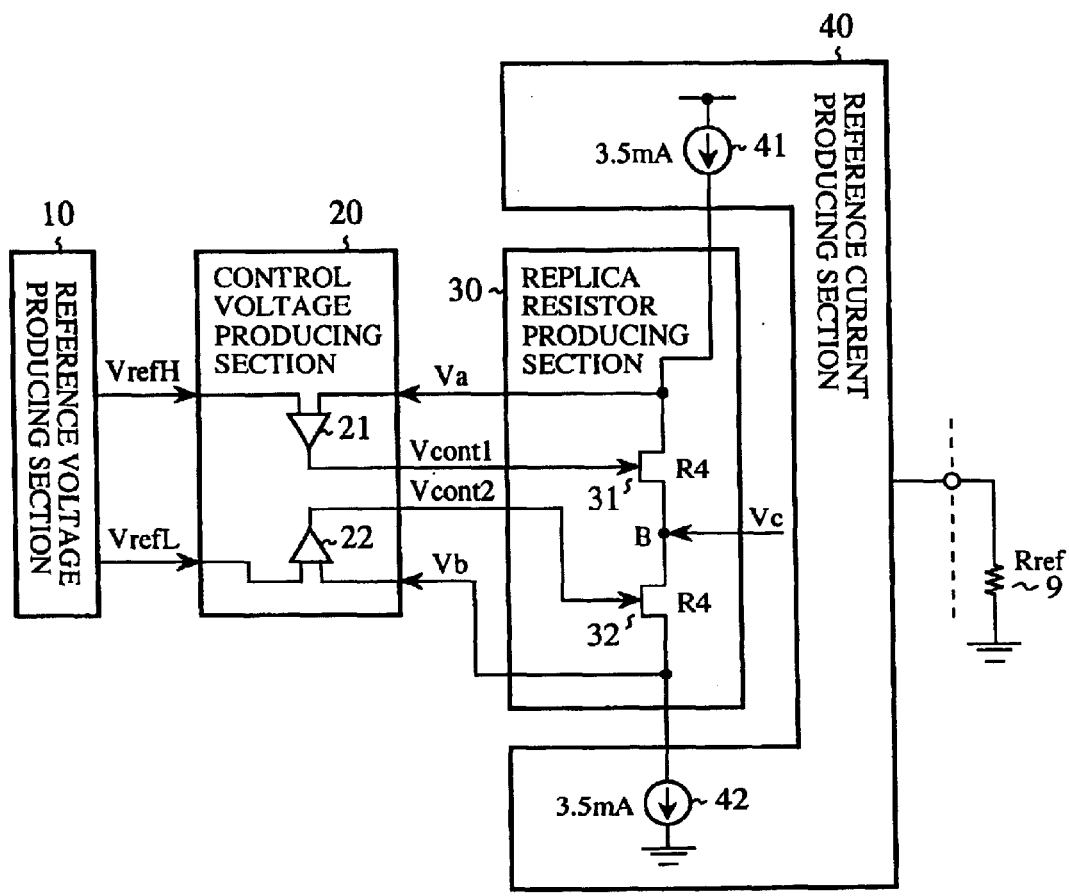
FIG. 7 is an equivalent circuit diagram of the differential termination resistor adjusting circuit in accordance with the preferred embodiment 5 of the present invention.
Figure 7:
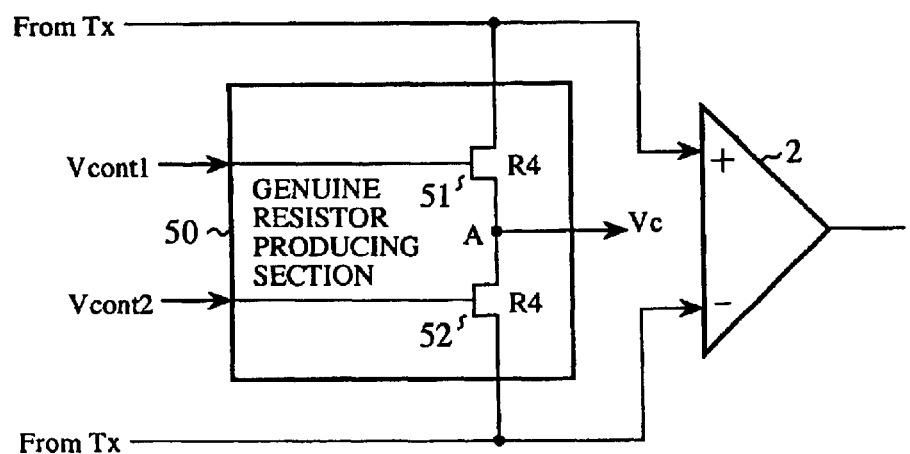

FIG. 7 is an equivalent circuit diagram of the differential termination resistor adjusting circuit in accordance with the preferred embodiment 5 of the present invention. In FIG. 7, the same reference numerals as those in FIG. 3 and FIG. 4 denote the same or equivalent constituent elements. In FIG. 7, reference numerals 31 and 32 denote N channel resistors; reference numerals 51 and 52 denote N channel transistors. In this preferred embodiment 5, the replica resistor producing section 30 and the genuine resistor producing section 50 of the preferred embodiment 2 are constituted in the manner shown in FIG. 7.

Next, connection will be described.

A reference current Iref from the current source 41 of the reference current producing section 40 flows into the drain of the N channel transistor 31 of the replica resistor producing section 30. The electric potential of the drain of the N channel transistor 31 is supplied as a voltage Va to the control voltage producing section 20. The source of the N channel transistor 31 is connected to the drain of the N channel transistor 32. A reference current flowing out of the source of the N channel transistor 32 flows into the current source 42 of the reference current producing section 40. The electric potential of the source of the N channel transistor 32 is supplied as a voltage Vb to the control voltage producing section 20. To the connection point of the source of the N channel transistor 31 and the drain of the N channel transistor 32 is applied a voltage Vc from the genuine resistor producing section 50. To the gate of the N channel transistor 31 is applied a voltage Vcont1 from the control voltage producing section 20. To the gate of the N channel transistor 32 is applied a voltage Vcont2 from the control voltage producing section 20.

The drain of the N channel transistor 51 of the genuine resistor 30 producing section 50 is connected to the non inverting input of the receiving side device 2. The source of the N channel transistor 51 is connected to the drain of the N channel transistor 52. The source of the N channel transistor 52 is connected to the inverting input of the receiving side device 2. To the gate of the N channel transistor 51 is supplied the control voltage Vcont1 from the control voltage producing section 20. To the gate of the N channel transistor 52 is supplied the control voltage Vcont2 from the control voltage producing section 20. The electric potential at the connection point of the source of the N channel transistor 51 and the drain of the N channel transistor 52 is supplied as a voltage Vc to the replica resistor producing section 30 and the reference resistor producing section 10.

Next, operation will be described.

The present preferred embodiment 5 is identical to the preferred embodiment 1 and the preferred embodiment 2 except for the fact that the replica resistor producing section 30 and the genuine resistor producing section 50 are constituted in the manner shown in FIG. 7. Thus, the operations of the replica resistor producing section 30 and the genuine resistor producing section 50 will be described. The other operations are equivalent to the operations in the preferred embodiment 1 and the preferred embodiment 2.

Figure 8:
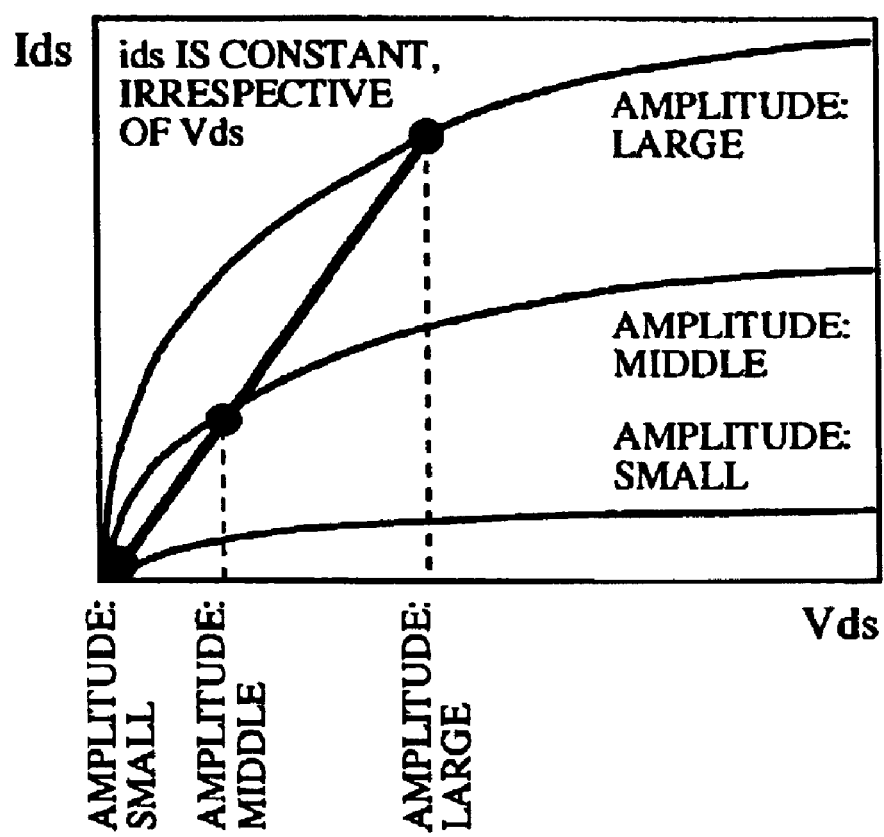
FIG. 8 is a graph to show the dependence of the on resistances Vds and Vgs of a MOS transistor.

FIG. 8 is a graph to show the dependence of the on resistor of a MOS transistor on Vds and Vgs. As is evident from FIG. 8, the on resistor of the MOS transistor is constant, independent of the Vds. In the present preferred embodiment 5, the N channel transistors 31 and 32 of the replica resistor producing section 30 and the N channel transistors 51 and 52 of the genuine resistor producing section 50 are constituted by the use of the MOS transistor. In this manner, the N channel transistors 31 and 32 and the N channel transistors 51 and 52 can be used as resistors.

As described above, the differential termination resistor adjusting circuit in accordance with the present preferred embodiment 5 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2), and wherein the electric potential of the reference point (A) of the genuine resistor producing section (50) is fed back to the reference point (B) of the replica resistor producing section (30), and wherein the replica resistor producing section (30) has two N channel MOS transistors (31, 32) connected in series to each other, and wherein the genuine resistor producing section (50) has two N channel MOS transistors (51, 52) connected in series to each other.

As described above, according to the present preferred embodiment 5, the input termination resistor is constituted by the use of the N channel MOS transistors. Therefore, it is possible to produce an effect of adjusting the resistance precisely.

Preferred Embodiment 6

Figure 9:
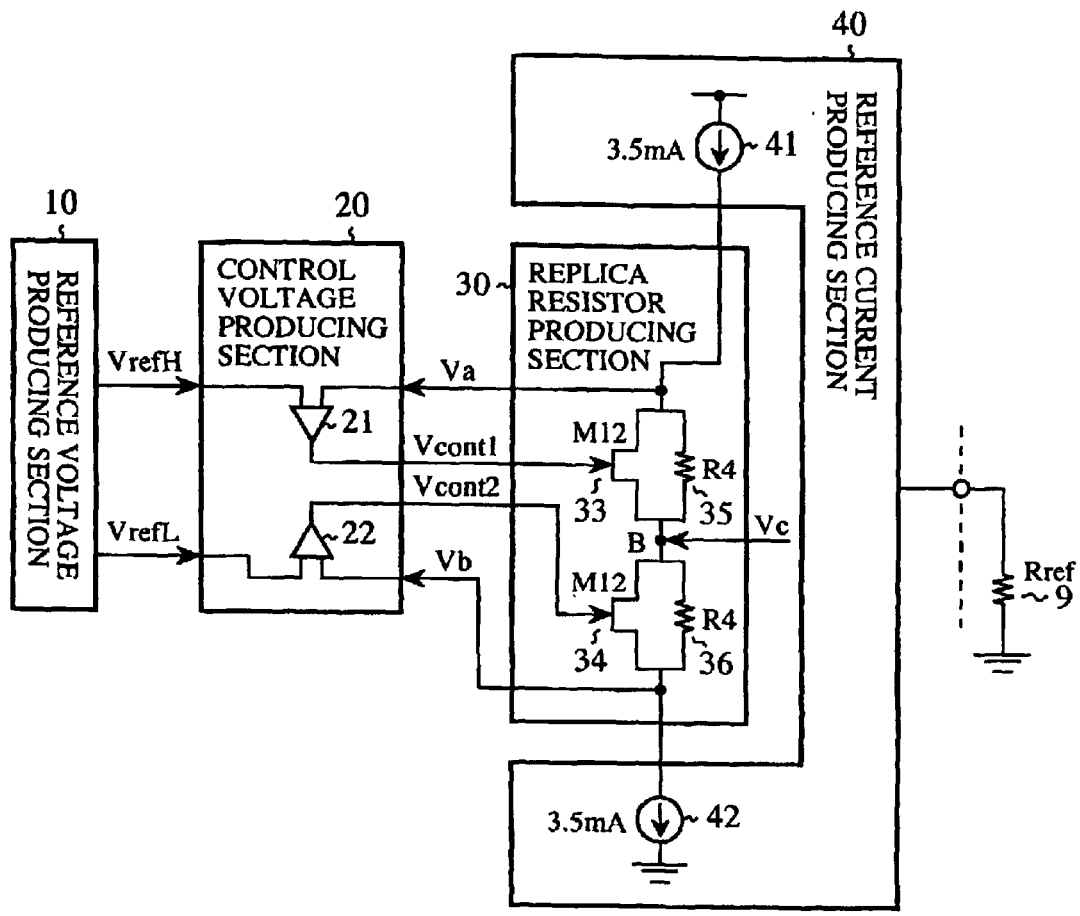
FIG. 9 is an equivalent circuit diagram of the differential termination resistor adjusting circuit in accordance with the preferred embodiment 6 of the present invention.
Figure 9:
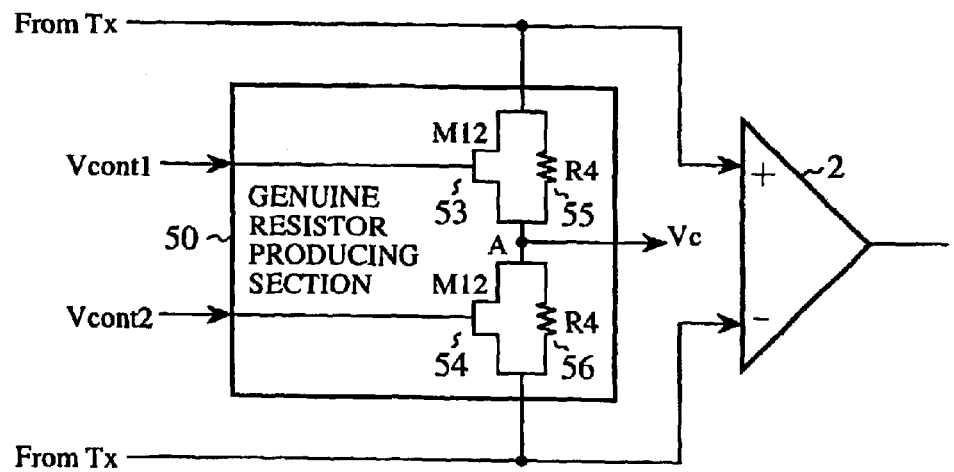

FIG. 9 is an equivalent circuit diagram of the differential termination resistor adjusting circuit in accordance with the preferred embodiment 6 of the present invention. In FIG. 9, the same reference numerals as those in FIG. 7 denote the same or equivalent constituent elements. In FIG. 9, reference numerals 33 and 34 denote N channel resistors; reference numerals 35 and 36 denote resistors; reference numerals 53 and 54 denote N channel transistors. In this preferred embodiment 6, the replica resistor producing section 30 and the genuine resistor producing section 50 of the preferred embodiment 2 are constituted in the manner shown in FIG. 9.

Next, connection will be described.

A reference current Iref from the current source 41 of the reference current producing section 40 flows into the drain of the N channel transistor 33 of the replica resistor producing section 30. The drain of the N channel transistor 33 is connected to the one terminal of the resistor 35. The electric potential of the drain of the N channel transistor 33 is supplied as a voltage Va to the control voltage producing section 20. The source of the N channel transistor 33 is connected to the drain of the N channel transistor 34 and the other terminal of the resistor 35. The drain of the N channel transistor 34 is connected to the one terminal of the resistor 36. A reference current flowing out of the source of the N channel transistor 34 flows into the current source 42 of the reference current producing section 40. The source of the N channel transistor 34 is connected to the other terminal of the resistor 36. The electric potential of the source of the N channel transistor 34 is supplied as a voltage Vb to the control voltage producing section 20. To the connection point of the source of the N channel transistor 33 and the drain of the N channel transistor 34 is applied a voltage Vc from the genuine resistor producing section 50. To the gate of the N channel transistor 33 is applied a voltage Vcont1 from the control voltage producing section 20. To the gate of the N channel transistor 34 is applied a voltage Vcont2 from the control voltage producing section 20.

The drain of the N channel transistor 53 of the genuine resistor producing section 50 is connected to the non inverting input of the receiving side device 2. The drain of the N channel transistor 53 is connected to the one terminal of the resistor 55. The source of the N channel transistor 53 is connected to the drain of the N channel transistor 54 and the other terminal of the resistor 55. The drain of the N channel transistor 54 is connected to the one terminal of the resistor 56. The source of the N channel transistor 54 is connected to the other terminal of the resistor 56. The source of the N channel transistor 54 is connected to the non inverting input of the receiving side device 2. To the gate of the N channel transistor 53 is supplied a control voltage Vcont1 from the control voltage producing section 20. To the gate of the N channel transistor 54 is supplied a control voltage Vcont2 from the control voltage producing section 20. The electric potential at the connection point of the source of the N channel transistor 53 and the drain of the N channel transistor 54 is supplied as a voltage Vc to the replica resistor producing section 30 and the reference resistor producing section 10.

Next, operation will be described.

The present preferred embodiment 6 is identical to the preferred embodiment 1 and the preferred embodiment 2 except that the replica resistor producing section 30 and the genuine resistor producing section 50 are constituted in the manner shown in FIG. 9. Thus, the operations of the replica resistor producing section 30 and the genuine resistor producing section 50 will be described. The other operations are equivalent to the operations in the preferred embodiment 1 and the preferred embodiment 2.

As shown in FIG. 9, in the present preferred embodiment 6, the N channel transistors 33, 34, 53, 54 are connected in parallel to the resistors 35, 36, 55, 56, respectively. The values of resultant resistors each of which is composed of a pair of N channel transistor and resistor connected in parallel to the N channel transistor are controlled by the control voltage Vcont1 and the control voltage Vcont2, respectively. In comparison with the preferred embodiment 5, each of the N channel transistors 33, 34, 53, 54 (NMOS) acts as a cushioning material for compensating variations in the resistances (R4) of the resistors 35, 36, 55, 56. That is, the present preferred embodiment 6 is characterized in that the adjusting range of the NMOS becomes smaller in the present preferred embodiment 6 than in the preferred embodiment 5.

As described above, the differential termination resistor adjusting circuit in accordance with the present preferred embodiment 6 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2), and wherein the electric potential of the reference point (A) of the genuine resistor producing section (50) is fed back to the reference point (B) of the replica resistor producing section (30), and wherein the replica resistor producing section (30) has two N channel MOS transistors (33, 34) connected in series to each other, the resistor (35) connected in parallel to the one transistor (33) of the two N channel MOS transistors, and the resistor (36) connected in parallel to the other transistor (34) of the two N channel MOS transistors, and wherein the genuine resistor producing section (50) has two N channel MOS transistors (53, 54) connected in series to each other, the resistor (55) connected in parallel to the one transistor (53) of the two N channel MOS transistors, and the resistor (56) connected in parallel to the other transistor (54) of the two N channel MOS transistors.

As described above, according to the present preferred embodiment 6, the input termination resistor is constituted by the use of the N channel MOS transistors and the resistors each of which is connected in parallel to each of the N channel MOS transistors. Thus, it is possible to produce an effect of reducing the adjusting range of the N channel MOS transistors to a range for compensating variations in the resistances of the resistors connected in parallel to the N channel MOS transistors.

Preferred Embodiment 7

Figure 10:
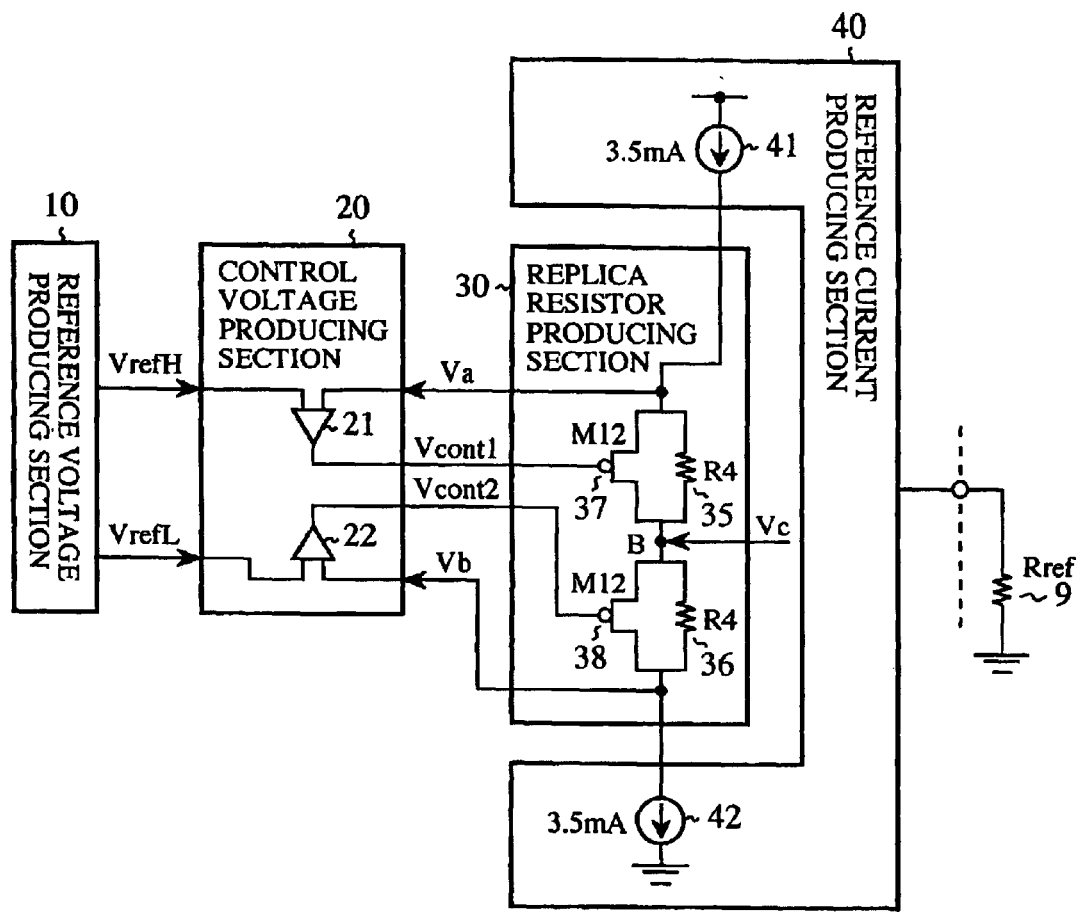
FIG. 10 is an equivalent circuit diagram of the termination resistor adjusting circuit in accordance with the preferred embodiment 7 of the present invention.
Figure 10:
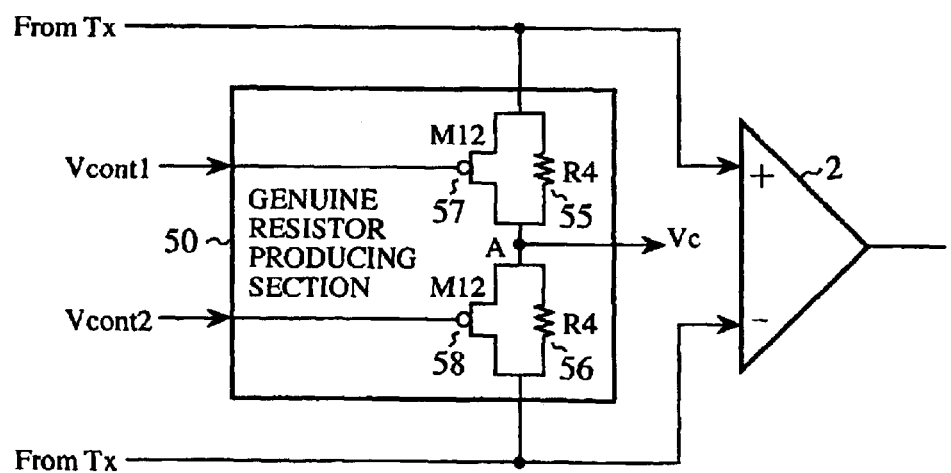

FIG. 10 is an equivalent circuit diagram of the differential termination resistor adjusting circuit in accordance with the preferred embodiment 7 of the present invention. In FIG. 10, the same reference numerals as those in FIG. 9 denote the same or equivalent constituent elements. In FIG. 10, reference numerals 37 to 38 denote P channel resistors; reference numerals 57 and 58 denote P channel transistors. In this preferred embodiment 7, the replica resistor producing section 30 and the genuine resistor producing section 50 of the preferred embodiment 2 is constituted in the manner shown in FIG. 10.

Next, connection will be described.

In the present preferred embodiment 7, the N channel transistors 33, 34, 53, 54 are replaced with the P channel transistors 37, 38, 57, and 58. They are connected in the same manner as in the preferred embodiment 6.

Next, operation will be described.

The present preferred embodiment 7 is identical with the preferred embodiment 6 except that the N channel transistors 33, 34, 53, 54 in the preferred embodiment 6 are replaced with the P channel transistors 37, 38, 57, 58. Thus, only the operation caused by the use of the P channel transistors 37, 38, 57, 58 will be described. The other operations are equivalent to the operations in the preferred embodiment 6.

As shown in FIG. 10, in the present preferred embodiment 7, each of the P channel transistors 37, 38, 57, 58 (PMOS) are connected in parallel to each of the resistors 35, 36, 55, 56. In comparison with the preferred embodiment 6, in the present preferred embodiment 7, opening the back gate of the PMOS further prevents an error Vth from being caused by a substrate effect.

As described above, the differential termination resistor adjusting circuit in accordance with the present preferred embodiment 7 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2), and wherein the electric potential of the reference point (A) of the genuine resistor producing section (50) is fed back to the reference point (B) of the replica resistor producing section (30), and wherein the replica resistor producing section (30) has two P channel MOS transistors (37, 38) connected in series to each other, the resistor (35) connected in parallel to the one transistor (37) of the two P channel MOS transistors, and the resistor (36) connected in parallel to the other transistor (38) of the two P channel MOS transistors, and wherein the genuine resistor producing section (50) has two P channel MOS transistors (57, 58) connected in series to each other, the resistor (55) connected in parallel to the one transistor (57) of the two P channel MOS transistors, and the resistor (56) connected in parallel to the other transistor (58) of the two P channel MOS transistors.

As described above, according to the present preferred embodiment 7, the input termination resistor is constituted by the use of the P channel MOS transistors and the resistors connected in parallel to the P channel MOS transistors. Thus, it is possible to produce an effect of reducing the adjusting range of the N channel MOS transistors to a range for compensating variations in the resistances of the resistors connected in parallel to the N channel MOS transistors and further, by opening the back gate of the PMOS, to prevent the error Vth from being caused by the substrate effect.

Preferred Embodiment 8

Figure 11:
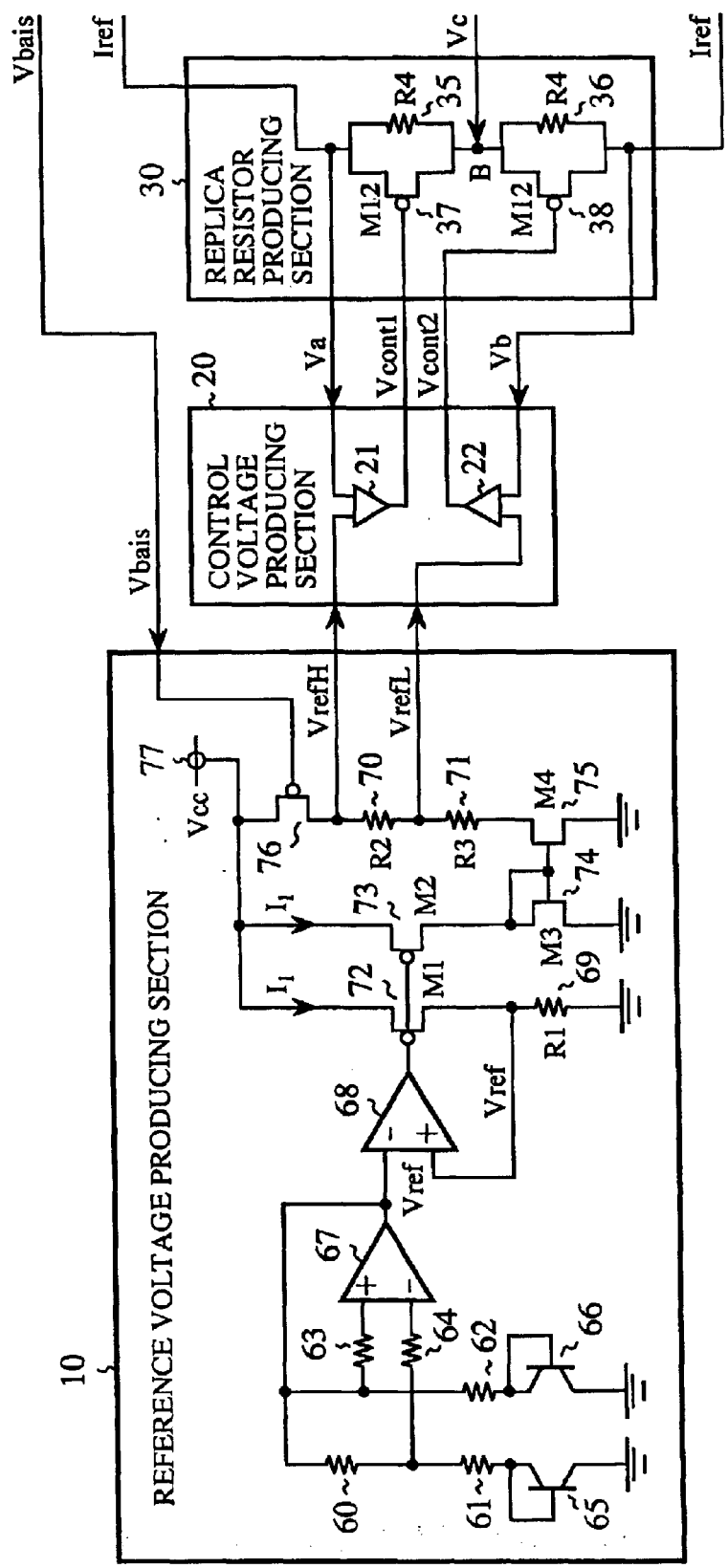
FIG. 11 is an equivalent circuit diagram of the differential termination resistor adjusting circuit in accordance with the preferred embodiment 8 of the present invention.
Figure 12:
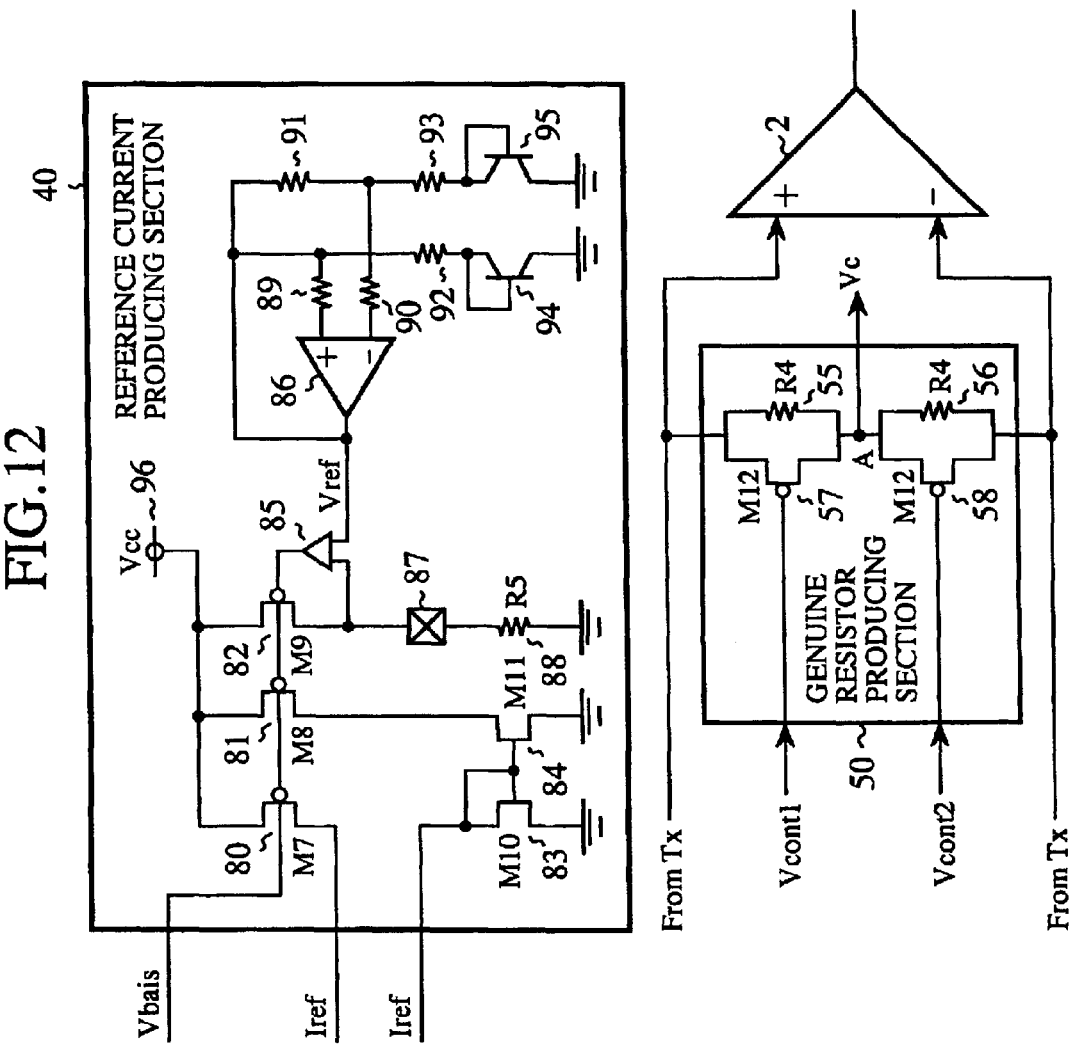
FIG. 12 is an equivalent circuit diagram of the differential termination resistor adjusting circuit in accordance with the preferred embodiment 9 of the present invention.
Figure 13:
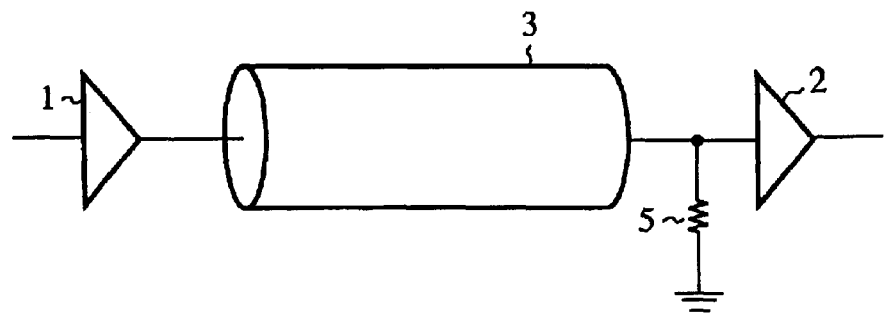
FIG. 13 is an equivalent circuit diagram of the data transmission between the different devices of a transmission system (single end transmission system) in the prior art.
Figure 14:
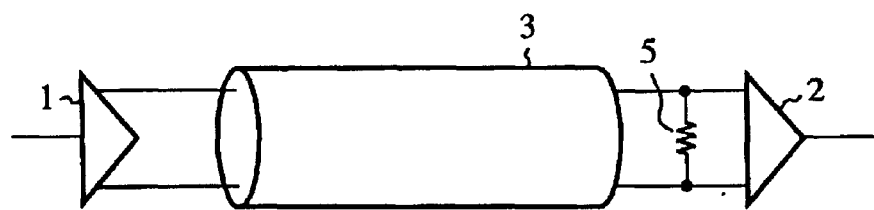
FIG. 14 is an equivalent circuit diagram of the data transmission between the different devices of a transmission system (differential transmission system) in the prior art.
Figure 15:
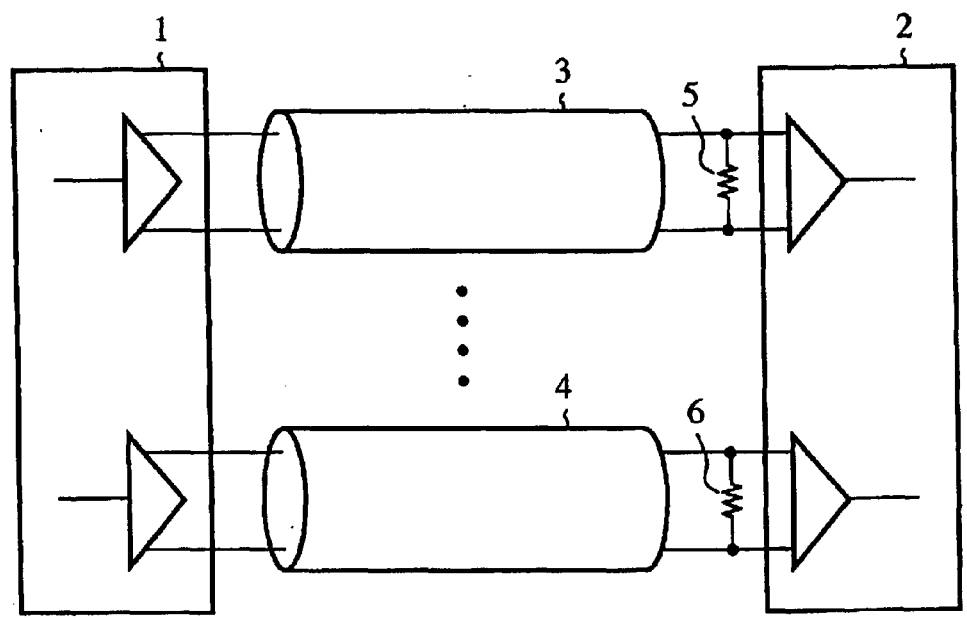
FIG. 15 is an equivalent circuit diagram of the data transmission between the different devices of a transmission system (transmission system having a matched impedance) in the prior art.

FIG. 11 and FIG. 12 are equivalent circuit diagrams of a differential resistor adjusting circuit of the present preferred embodiment 8. In FIG. 11 and FIG. 12, the same reference numerals as those in FIG. 5, FIG. 6, and FIG. 10 denote the same or equivalent constituent elements. In the present preferred embodiment 8, as the reference voltage producing section 10, the replica resistor producing section 30 and the genuine resistor producing section 50 in the preferred embodiment 2 are adopted the reference voltage producing section 10 in preferred embodiment 3 (FIG. 5), the replica resistor producing section 30 in the preferred embodiment 4 (FIG. 6) and the genuine resistor producing section 50 in the preferred embodiment 7 (FIG. 10).

Next, operation will be described.

The operations in the present preferred embodiment 8 are the same as the operation in the preferred embodiment 2, the operation of the reference voltage producing section 10 in the preferred embodiment 3, the operation of the reference current producing section 40 in the preferred embodiment 4 and the operation of the replica resistor producing section 30 and the genuine resistor producing section 50 in the preferred embodiment 7.

As described above, the differential termination resistor adjusting circuit in accordance with the present preferred embodiment 8 includes the reference current producing section (40) that produces the nearly constant reference current (Iref) irrespective of variations in power supply voltage, temperature, and manufacturing; the reference voltage producing section (10) that produces the nearly constant reference voltages (VrefH, VrefH) irrespective of variations in power supply voltage, temperature, and manufacturing; the replica resistor producing section (30) that is supplied with the reference current (Iref) to produce voltage drops (Va, Vb); the control voltage producing section (20) that produces the control voltages (Vcont1, Vcont2) based on the reference voltages (VrefH, VrefL) and the voltage drops (Va, Vb); and the genuine resistor producing section (50) that is built in the receiving side device (2) and is connected to the input terminal, wherein the resistance of the replica resistor producing section and the resistance of the genuine resistor producing section are adjusted by the control voltages (Vcont1, Vcont2), and wherein the electric potential of the reference point (A) of the genuine resistor producing section (50) is fed back to the reference point (B) of the replica resistor producing section (30), and the reference voltage producing section (10) has a band gap circuit (60 to 64, 65 to 67), and the reference current producing section (40) has a band gap circuit (86, 89 to 93, 94, 95) and an external terminal (87) to which an external resistor having nearly constant resistance even if power supply voltage and temperature vary is connected, and wherein the replica resistor producing section (30) has two P channel MOS transistors (37, 38) connected in series to each other, the resistor (35) connected in parallel to the one transistor (37) of the two P channel MOS transistors, and the resistor (36) connected in parallel to the other transistor (38) of the two P channel MOS transistors, and wherein the genuine resistor producing section (50) has two P channel MOS transistors (57, 58) connected in series to each other, the resistor (55) connected in parallel to the one transistor (57) of the two P channel MOS transistors, and the resistor (56) connected in parallel to the other transistor (58) of the two P channel MOS transistors.

As described above, according to the present preferred embodiment 8, the reference voltage is produced by the use of the band gap circuit. Thus, it is possible to produce an effect of precisely adjusting the resistance of the input termination resistor.

As described above, according to the present preferred embodiment 4, there is provided the external terminal for externally mounting one reference resistor that is proportional to the characteristic impedance of the transmission line. Thus, this can make it possible to make the termination resistors of all data buses equal to the characteristic impedance of the transmission line and to vary the value of the impedance. Therefore, it is possible to produce an effect of making a semiconductor device shareable also in systems each having a different characteristic impedance of the transmission line without redesigning the semiconductor device by changing the resistance of the reference resistor in the differential transmission system.

According to the present preferred embodiment 8, the input termination resistor is constituted by the use of the P channel MOS transistors and the resistors connected in parallel to the P channel MOS transistors. Thus, it is possible to produce an effect of reducing the adjusting range of the P channel MOS transistors to a range for compensating variations in the resistances of the resistors connected in parallel to the N channel MOS transistors and further, by opening the back gate of the PMOS, to prevent the error Vth from being caused by the substrate effect.

What is claimed is:

1. A differential termination resistor adjusting circuit comprising:
    a reference current producing section that produces a nearly constant reference current irrespective of variations in power supply voltage, temperature, and manufacturing;
    a reference voltage producing section that produces a nearly constant reference voltage irrespective of variations in the power supply voltage, the temperature, and the manufacturing;
    a replica resistor producing section that is supplied with the reference current to produce a voltage drop;
    a control voltage producing section that produces a control voltage based on the reference voltage and the voltage drop; and
    a genuine resistor producing section that is built in a receiving side device and is connected to an input termination, wherein the resistances of the replica resistor producing section and the genuine resistor producing section are adjusted by the control voltage,
    wherein an electric potential of the reference point of said genuine resistor producing section is fed back to a reference point of the replica resistor producing section.

2. The differential termination resistor adjusting circuit as claimed in claim 1, wherein the reference voltage producing section has a band gap circuit.

3. The differential termination resistor adjusting circuit as claimed in claim 1, wherein the reference current producing section has a band gap circuit and an external terminal to which an external resistor having a nearly constant resistance even when the power supply voltage fluctuates and the temperature changes.

4. The differential termination resistor adjusting circuit as claimed in claim 1, wherein the replica resistor producing section has two N channel MOS transistors connected in series to each other, and wherein the genuine resistor producing section has two N channel MOS transistors connected in series to each other.

5. The differential termination resistor adjusting circuit as claimed in claim 1, wherein the replica resistor producing section has two N channel MOS transistors connected in series to each other, a resistor connected in parallel to one transistor of the two N channel MOS transistors and a resistor connected in parallel to the other transistor of the two N channel MOS transistors, and wherein the genuine resistor producing section has two N channel MOS transistors connected in series to each other, a resistor connected in parallel to one transistor of the two N channel MOS transistors, and a resistor connected in parallel to the other transistor of the two N channel MOS transistors.

6. The differential termination resistor adjusting circuit as claimed in claim 1, wherein the replica resistor producing section has two P channel MOS transistors connected in series to each other, a resistor connected in parallel to one transistor of the two P channel MOS transistors and a resistor connected in parallel to the other transistor of the two P channel MOS transistors, and wherein the genuine resistor producing section has two P channel MOS transistors connected in series to each other, a resistor connected in parallel to one transistor of the two P channel MOS transistors and a resistor connected in parallel to the other transistor of the two P channel MOS transistors.

7. The differential termination resistor adjusting circuit as claimed in claim 1, wherein the reference voltage producing section has a band gap circuit, the reference current producing section has a band gap circuit and an external terminal to which an external resistor having a nearly constant resistance even when the power supply voltage fluctuates and the temperature changes, the replica resistor producing section has two P channel MOS transistors connected in series to each other, a resistor connected in parallel to one transistor of the two P channel MOS transistors and a resistor connected in parallel to the other transistor of the two P channel transistors, and the genuine resistor producing section has two P channel MOS transistors connected in series to each other, a resistor connected in parallel to one transistor of the two P channel MOS transistors and a resistor connected in parallel to the other transistor of the two P channel MOS transistors.

* * * * *